United States Patent [19]

Coviello

[11] 4,143,401
[45] Mar. 6, 1979

[54] SYSTEM FOR GENERATING LINE DRAWING OF A SCANNED IMAGE

[75] Inventor: John W. Coviello, Baltimore, Md.

[73] Assignee: Westinghouse Electric Corp., Pittsburgh, Pa.

[21] Appl. No.: 813,561

[22] Filed: Jul. 7, 1977

[51] Int. Cl.² .................. H04N 1/22; H04N 5/14; H04N 5/79
[52] U.S. Cl. ........................................ 358/96; 364/515
[58] Field of Search .................. 358/96, 283; 364/515

[56] References Cited

U.S. PATENT DOCUMENTS

| | | | |
|---|---|---|---|
| 3,249,690 | 5/1966 | Schubert | 358/280 |
| 3,294,896 | 12/1966 | Young, Jr. | 358/283 X |

Primary Examiner—Robert L. Richardson
Attorney, Agent, or Firm—J. B. Hinson

[57] ABSTRACT

A digital circuit for detecting changes in the gray scale of scanned images is disclosed. Each line of video information produced by scanning the image is digitized. Each digital sample is compared to digital samples delayed a predetermined amount to generate a difference signal which is indicative of a change in the gray scale having a component perpendicular to the direction of scan. The digitized samples of the video signal are also stored in a memory having a capacity sufficient to store data representing a plurality of scan lines with a typical memory having a capacity for storing digital information representing eight scan lines. Selected digital samples from the stored data are compared to samples of the line being scanned to detect changes in the gray scale having a component parallel to the direction of scan. These detected changes in the gray scale are combined to generate a signal which operates a printer to generate a line drawing of the scanned image.

9 Claims, 8 Drawing Figures

SYSTEM FOR GENERATING LINE DRAWING OF A SCANNED IMAGE

CROSS-REFERENCE TO RELATED PATENT APPLICATIONS

Patent Application Ser. No. 828,057, Westinghouse Docket No. W.E. 47,229 is a modification of the system disclosed herein.

BACKGROUND OF THE INVENTION

1. Field of the Invention

The invention relates to scanners and more particularly to scanners for detecting changes in the gray scale of a scanned image to generate a line drawing corresponding to the changes in the gray scale of the image.

2. Description of the Prior Art

Typical prior art systems for scanning an image to generate a line drawing corresponding to the changes in the gray scale of the scanned image have relied on analog techniques. Changes in the gray scale were generally detected by taking either the first or second derivative of the video signal from the scanner, or some combination of these, to generate signals indicative of the changes in gray scale of the scanned image. A typical example of such a system is disclosed in Patent Application Ser. No. 585,641 assigned to the same assignee as this application and now U.S. Pat. No. 4,072,818. These systems had limited capability of detecting changes in the gray scale which were parallel to the direction of scan. Additionally the line width of the line drawing generated by these systems tended to vary depending on the direction of the line with respect to the direction of scanning.

SUMMARY OF THE INVENTION

The system disclosed by this application is all digital and is capable of detecting changes in the gray scale with the detection capability being substantially independent of the direction of the changes in gray scale with respect to the scanning. This results in a system which is capable of producing line drawings corresponding to changes in the gray scale with the capability of detection of changes in the gray scale and controlling the width of the line being substantially independent of direction. This superior result is produced by detecting changes in the gray scale in a direction parallel to the scanning and at right angles thereto to generate two signals one indicative of changes in the gray scale in a direction perpendicular to scanning and a second signal indicative of changes in the gray scale parallel to the direction of scanning. These two signals are combined to produce a line drawing on a printer with the lines having substantially constant width with the ability to detect changes in gray scale being substantially independent of direction. This improved result is accomplished by sampling the video signal representing each scan line to produce digital numbers indicative of the amplitude of the video signal at the sample time. Changes in the gray scale in a direction perpendicular to the scanning is accomplished by comparing each digitized value of the video signal to a previous sample from the same scan line. When the amplitude of this difference exceeds a predetermined amount this difference is interpreted as a change in the gray scale of the image being scanned. This results in a digital signal having an adjustable time duration which drives a printer to generate a line segment having a predetermined length and a direction parallel to the direction of scanning.

The digital numbers representing the instantaneous values of the video signal at the sampling time are also stored in a digital memory. Sufficient memory is provided to store several lines, typically eight, of the video signal. Changes in the gray scale having a direction parallel to the direction of scan are detected by comparing each digital number representing the video signal to a corresponding digital number from a previously scanned and stored line. When the difference between these two numbers exceeds a predetermined value, a digital signal is produced which also drives the same printer to produce a line segment on the printer having a predetermined width and a line direction parallel to the direction of scan. The combination of the two line segments results in a line drawing being produced by the printer with the lines corresponding to changes in the gray scale of the scanned image.

The line drawing representing the changes in gray scale may be printed in either positive or negative format. That is, the changes in gray scale can be printed as black lines of predetermined width on a white background or they may be printed as white lines of a predetermined width on a black background.

BRIEF DESCRIPTION OF THE DRAWINGS

FIG. 8 is a circuit diagram for combining the signals indicative of changes in the gray scale in both the direction perpendicular to the scan line and parallel thereto to generate a composite signal to drive the printer.

DETAILED DESCRIPTION OF THE DRAWINGS

Figure 1:
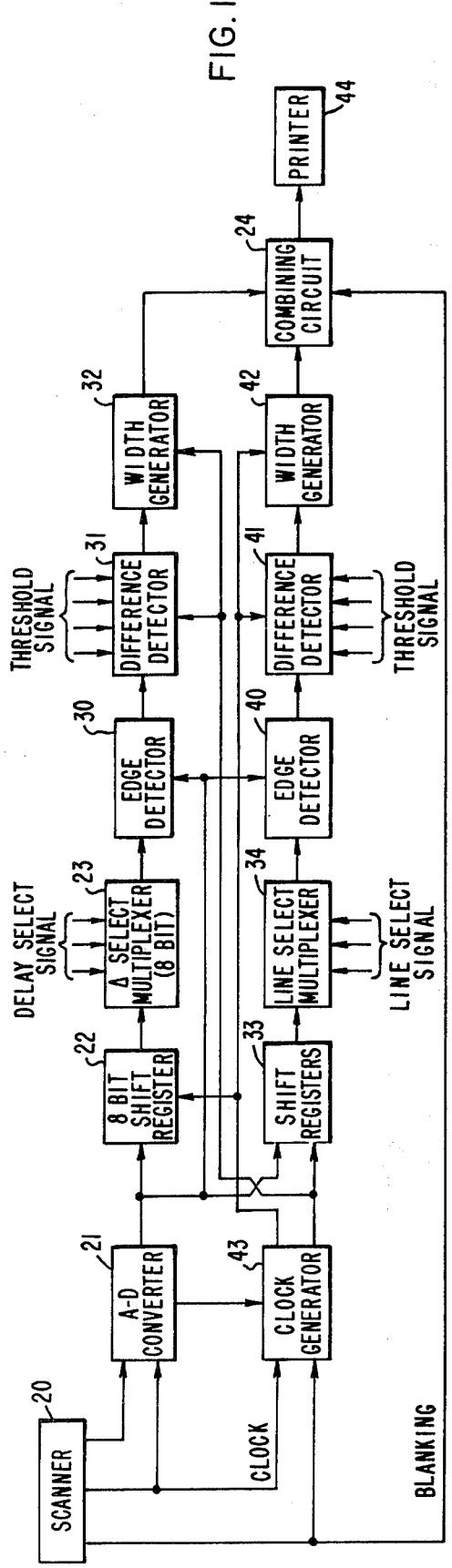
FIG. 1 is a functional block diagram of the preferred embodiment of the invention.

FIG. 1 is a block diagram of the preferred embodiment of the invention. The system includes a scanner 20 which scans an image, for example, a photograph. The scanner 20 may be any suitable type of scanner, for example, a TV camera or a laser-type scanner. In the preferred embodiment scanner 20 is a laser which scans the image to produce a line of video information each time the image is scanned.

Each line of video information from scanner 20 is coupled to an 8-bit analog to digital converter 21. A clock signal is also provided by scanner 20 to the analog-to-digital converter 21 permitting each line of video information generated by scanner 20 to be sampled to generate 4,098 digital numbers with each number representing the instantaneous amplitude of the video signal at the sample time.

The output data of the A to D converter 21 is stored in a memory shift register 22. In the preferred embodiment each sample of the video signal generates an 8-bit digital word at the output of analog-to-digital converter 21. Eight digital bits for each sample are available at the output of analog-to-digital converter 21 and are stored in a shift register-type memory 22. The shift register memory 22 has sufficient storage capacity to store eight samples of the video signal. Shift register memory 22 is arranged such that the data stored in each stage of the shift register is available as an input to a multiplexer 23. A digital delay select signal is also coupled to multiplexer 23 to select the output signals of the shift register 22 which are to be coupled to the output terminal of multiplexer 23 to generate a digitized and delayed version of the video signal appearing at the input of the analog-to-digital converter 21.

Changes in the gray scale of the image being scanned by scanner 20 are detected by an edge detector circuit 30. Edge detector circuit 30 compares the amplitude of the delayed digitized version of the video input signal appearing at the output of multiplexer 23 to the output of the analog-to-digital converter 21 to generate a signal indicative of the absolute difference betweeen these two signals. This absolute difference is compared to a threshold signal by a difference detector 31 to generate a single bit digital signal indicating that the absolute difference is either above or below the threshold. A predetermined number of the bits of this signal are shifted into a shift register which is included in a difference center detector circuit 31. The bits stored in this register are used to detect the center of out-of-focus edges or gradual changes of the gray scale of the scanned image. The operation of this circuit will be described in detail later. In some applications it may not be necessary to detect out-of-focus edges or gradual changes in the gray scale of the image. However, if it is desired to make an accurate line drawing of an object from a photograph which includes out-of-focus edges, some technique must be used to detect the center of these edges.

In the preferred embodiment of the invention the digital bits indicating that the difference between the delayed video signal and video signal exceeds the threshold are shifted into an eight-bit shift register. This permits the 8 bits stored in the shift register or these 8 bits and the output signal of the edge detector 30 to be examined to determine the center of changes in the gray scale of the image being scanned. In the first case, the central portion of a change in the gray scale is indicated when the center bit of the nine bits is a logic "one" immediately surrounded by a symmetrical pattern of logic "one" bits with the remaining bits being logic "zeroes". In the second case, the central portion of the change in the gray scale is indicated when the two center bits are logic one bits immediately surrounded by a symmetrical pattern of logic "one" bits with the remainder of the 8 bits being logic "zeroes". When either of these conditions are satisfied a signal is coupled to a pulse width generator 32. The output of the pulse width generator 32 is a pulse indicating the width and position of the vertical line segment to be printed by the printer corresponding to the detected change in the gray scale of the image being scanned.

The 8-bit output signal of the analog-to-digital converter 21 is also coupled to the input of a second series of shift registers 33. Included in the shaft register 33 is eight individual shift registers with each of these registers having sufficient capacity to store digital data representing one of the video signals from scanner 20.

The registers 33 are arranged such that the output from each register serves as an input to a multiplexer 34. A 3-bit digital signal serves as a second input to multiplexer 34 to enable the selection of the appropriate input signal to generate at the output of this multiplexer a digital signal spaced from the real time video signal coupled to the input of analog-to-digital converter 21 by the selected number of lines of the video signal from the scanner 20. Edge detector 40 subtracts the delayed digitized signal from the multiplexer 34 from the real time digitized signal and takes the absolute value of this difference to generate an output signal which is coupled to difference detector 41. Difference detector 41 compares the output signal of edge detector 40 to a threshold signal and generates a digital signal indicating when the output signal exceeds the threshold. This digital signal is coupled to a width generator 42. Width generator 42 generates a signal which is coupled to the combining circuit 24 to generate a drive signal which causes the printer 44 to print a horizontal line segment having a predetermined width. Printer 44 may be any device capable of producing line drawings in response to a digital (two level) input signal. Laser printers are suitable, for example.

The sampling rate of the analog-to-digital converter 21 is controlled by a clock signal provided by the scanner 20. Additionally, scanner 20 provides a blanking signal during the retrace time which is also coupled to the combining circuit 24 to disable this circuit and the printer 44 during the retrace. Additionally, the analog-to-digital converter 21 generates a pulse indicating that each sample has been converted to its digital equivalent and that this digital equipment is available at the output of analog-to-digital converter 21. These signals are coupled to a clock generator circuit 43 to generate control signal for controlling the shift registers and other circuits previously described.

Figure 2:
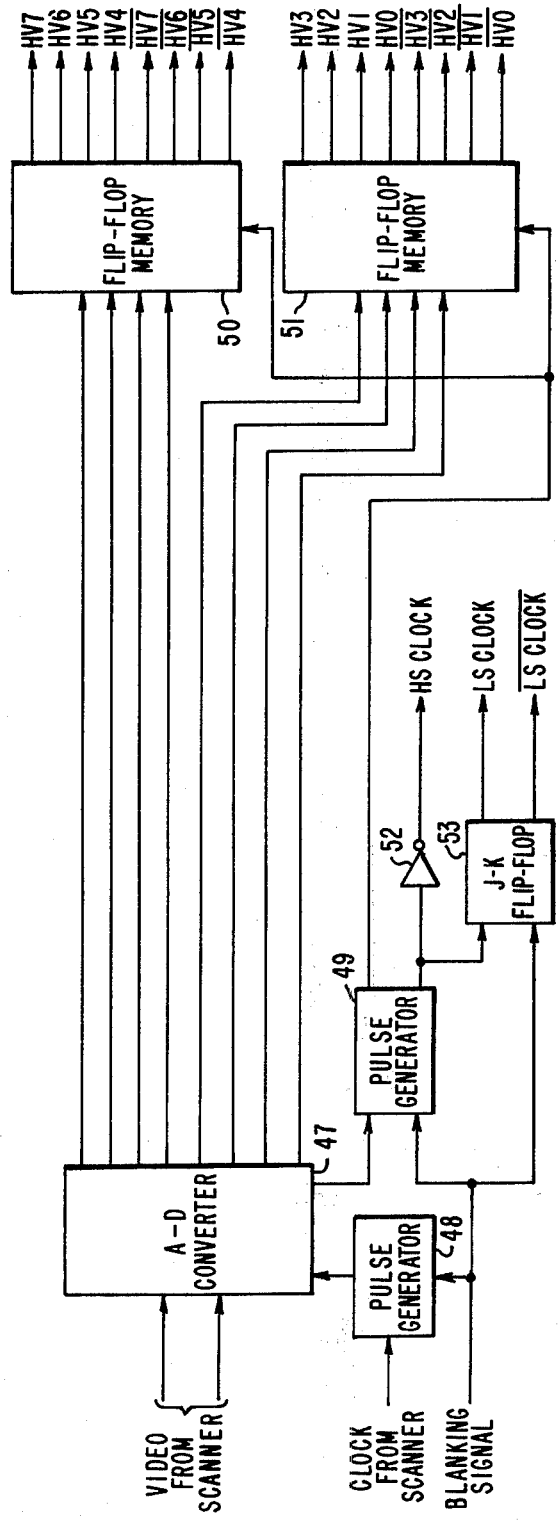
FIG. 2 is a block diagram of the digitizer used by the system.

FIG. 2 is a more detailed block diagram of the analog-to-digital converter 21 and the clock generator 43. The video signal from the scanner 20 is coupled to the analog input of the analog-to-digital converter 47. This analog-to-digital converter may be Model No. ADC-G8B made by Datel Corporation. The clock signal from the scanner 20 which specifies the sampling rate is coupled to the input of a 70 nanosecond pulse generator circuit 48. The blanking signal from the scanner 20 is coupled to the disable input of this circuit to inhibit the generation of pulses during the blanking interval. This arrangement permits the clock signal specifying the sampling times from the scanner 20 to be free running and reduces the memory space required because the memory shift registers (22 and 33, FIG. 1) are not shifted during the blanking interval.

The output signal of the 70-nanosecond pulse generator 48 is coupled to the sample input of the analog-to-digital converter 47. Each output pulse of the 70-nanosecond pulse generator 48 causes the analog-to-digital converter 47 to sample the video signal from the scanner 20 to generate an 8-bit digital output signal corresponding to the amplitude of the video signal from the scanner 20 at the time of the sample. When sampling is complete the analog-to-digital converter 47 provides an input pulse to a 500-nanosecond pulse generator 49. The blanking signal from the scanner 20 is also coupled to this pulse generator 49 to disable this circuit during the blanking interval. Two complementary output signals are available from the 500-nanosecond pulse generator 49. One of these signals is coupled to the clock input of flip-flop memories 50 and 51. This clock signal causes these flip-flops to be set to values corresponding to the output of the analog-to-digital converter 47. This results in generating a digital number at the outputs of these two flip-flop memories corresponding to the outputs of the analog-to-digital converter 47. The output bits of these flip-flop memories, 50 and 51, have been labeled HV0 through HV7, with HV0 being the least significant bit and HV7 being the most significant bit. The inverted version of each bit is also available. The inverted bits are indicated by a "bar", in the conventional manner.

The second output of the 500-nanosecond pulse generator circuit 49 is inverted by a buffer gate 52 to generate high speed (HS) clock signal. A flip-flop 53 also receives the output signal of the 500-nanosecond pulse generator circuit 49 and divides this signal by two to generate a second low speed (LS) clock signal. The use of these signals will be described in more detail subsequently.

Figure 3:
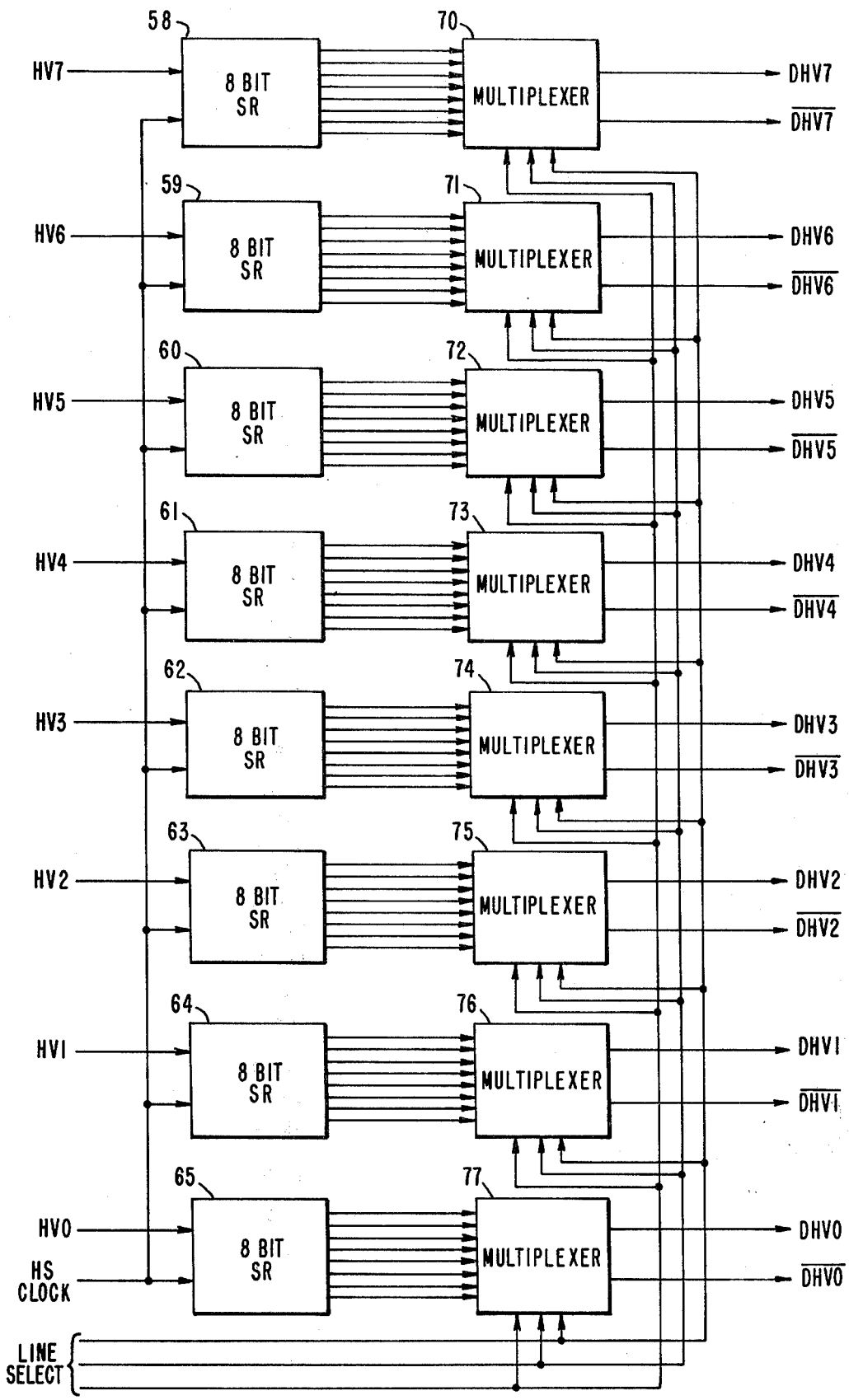
FIG. 3 is a block diagram of the memories used to delay the video samples to detect changes in the gray scale in a direction perpendicular to the direction of scanning.

FIG. 3 is a more detailed diagram of the shift register memory 22 and the multiplexer 23 illustrated in FIG. 1. As previously explained, the shift register 22 in FIG. 1 is actually eight individual shift registers. Each register is capable of storing 8 bits of digital information. The inputs to these 8 registers are the digital bits comprising the digital numbers representing the amplitude of the video signal from the scanner 20. These 8-bit shift registers are illustrated at reference numerals 58 through 65 (FIG. 3). The digital numbers representing the video signals are provided to the input of these registers by coupling the data input terminal of each of the 8-bit shift registers, 58 through 65, to the appropriate output terminal of flip-flop memories 50 and 51 (FIG. 2). Input signals to these shift registers are labeled HV0 to HV7 to correspond to the signal designations used in FIG. 1. Data is shifted into these shift registers by coupling the clock signal terminal of each of the shift registers 58 through 65 to the high speed clock signal derived from the output of a gate 52, (FIG. 2). As previously explained, this clock signal includes a pulse which immediately follows the setting of flip-flop memories 50 and 51. This causes an additional data bit to be shifted into shift registers 58 through 65 for each cycle of the analog-to-digital converter 47, (FIG. 2). Since the shift registers 58 through 65 are only 8 bits long, only eight samples of the video signal from the scanner 20 are stored in these registers.

Shift registers 58 through 65 are designed such that the data stored in each stage of these shift registers is available as an output signal. These output signals are coupled as inputs to multiplexers, 70 through 77. A 3-bit digital select signal specifying the delay desired is coupled to the second input of each of the multiplexers 70 through 77 to select which of the input signals from registers 58 through 65 are to be coupled to the output of these multiplexers. This permits the generation at the output of these multiplexers, 70 through 77, a digital signal which is a delayed version of the video signal coupled to the analog-to-digital converter 47 (FIG. 2). The selected digital signal and its complement are available at the output of multiplexers 70 through 77. The availability of both polarities of this signal simplifies the comparison of this signal to a selected threshold, as will be subsequently described.

Figure 4:
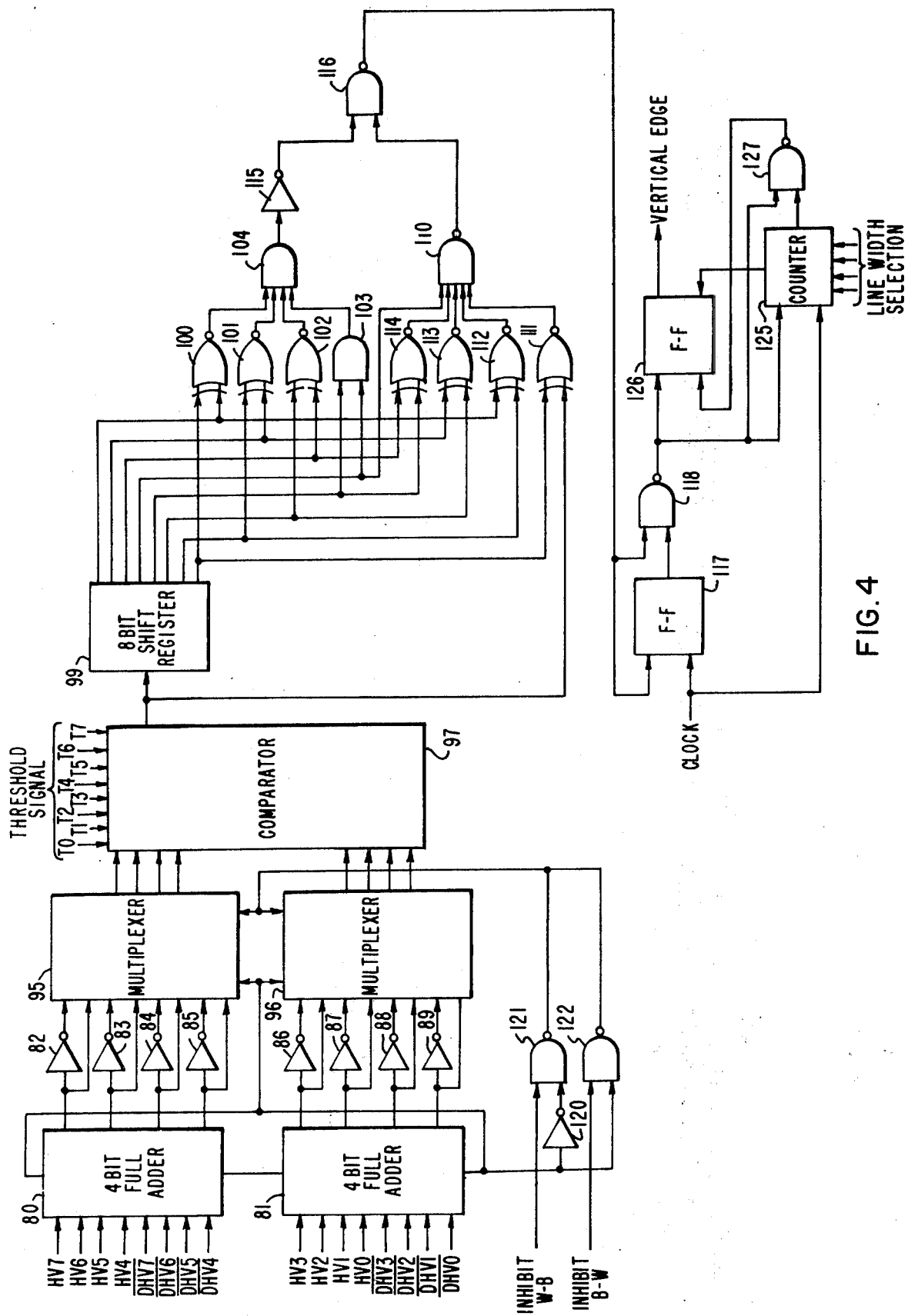
FIG. 4 is a diagram of the circuitry used to detect changes in the gray scale to generate line segments perpendicular to the direction of scan.

FIG. 4 is a detailed diagram of the edge detector 30 (FIG. 1) difference detector 31 (FIG. 1) and width generator 32 (FIG. 1). A digital number corresponding to the amplitude of the video signal at the last sampling interval is available at the output of flip-flop memory circuits 50 and 51 (FIG. 2). The complement of the digital number corresponding to the amplitude of the video signal at selected previous sampling interval is available at the output of 8 multiplexers, 70 through 77 (FIG. 3). These two signals are coupled to the input of two 4-bit adder circuits, 80 and 81 (FIG. 4). The output bits of these adders, 80 and 81, are inverted by inverter circuits, 82 through 89. The inverted output bits of adders 80 and 81 or the non-inverted output bits of these adders, are selected by two multiplexer circuits 95 and 96 to generate an 8-bit digital number equal to the absolute value of the difference between the digital numbers representing the current amplitude of the video signal and a digital number representing the amplitude of this signal at a prior selected time. More specifically, when the grey scale changes in the positive direction (white), the carry bit will be a logic "one" and is added to the result. The adder output in this condition is the absolute value and is selected by the multiplexer due to the carry bit being applied to its control input. When the grey scale change is negative (black), the carry bit will be logic "zero" and the complement of the adder outputs is equal to the absolute value of the difference. In this condition the carry bit applied to the multiplexer control input causes the output of the inverters 82 through 89 to be selected. This absolute value of the difference between the two inputs is compared to a threshold signal by a comparator 97. When the absolute value of the outputs of the two adders 80 and 81 exceeds the threshold signal a logic "one" signal is generated and shifted into an 8-bit shift register 99. If the change in gray scale of the image is not rapid, the logic "one" output signal from comparator 97 may encompass several clock pulses. This prohibits detection of the precise center of the gray scale change in the image being scanned by simply examining the output signal of the comparator 97. Any ambiguity which may exist is eliminated by examining the pattern of one and zero bits shifted into the shift register 99 with the central portion of the change in gray scale of the image being scanned indicated by the center of a pattern of logic one bits stored in the shift register 99.

More specifically, the first and last bit of shift register 99 are coupled to be inputs of a first exclusive NOR gate 100. Similarly, the second and seventh bits, the third and sixth bits are coupled to the inputs of two additional exclusive NOR gates 101 and 102. The fourth and fifth bits of the 8-bit register 99 are coupled to the inputs of an AND gate 103. Thus, so long as there is a symmetrical pattern logic "one" bits stored in the 8-bit shift register 99, the output signals of exclusive NOR's 100, 101 and 102 and AND gate 103 will all be logic ones. The output signal of all these gates are combined in a four input AND gate 104 to generate a signal indicating that a symmetrical pattern of logic "one" bits with at least the fourth and fifth bits being logic "ones" are stored in the 8-bit shift register 99. These gates will not provide an output when the 8-bit shift register 99 has an odd number of logic "one" bits stored therein. Additionally, if the input signal to the 8-bit shift register 99 is considered, it is possible to have a symmetrical pattern of logic "one" bits stored in this register 99 which comprises an odd number of logic "one" bits. This pattern of bits is detected by coupling the fourth bit of the shift register 99 to one input of a NAND gate 110. The output signal of the comparator 97 and the last bit of shift register 99 are coupled to the input terminals of an exclusive NOR gate 111. Similarly, the first and seventh, second and sixth, third and fifth bits of shift register 99 form inputs to exclusive NOR gates 112 through 114. The output signals of the four exclusive OR gates, 111 through 114, also form inputs to NAND gate 110. The output signal of AND gate 104 is inverted by an inverter 115. Output signals from the inverter 115 and the NAND gate 110 are combined in a NAND gate 116 to produce a logic signal indicating that a symmetrical pattern of logic "one" and logic "zero" bits are stored in the 8-bit shift register 99. This corresponds to the central portion of a change in the gray scale of the image being scanned.

The signal indicating the central portion of a change in gray scale of the image being scanned is coupled to the enable input of a triggerable flip-flop 117. This causes the output of this flip-flop to go to a logic one on the leading edge of the first pulse of the high speed clock following detection of the central portion of a change in gray scale of the image being scanned. The complementary output of this flip-flop 117 forms a first input to a NAND gate 118. The second input to this gate is the output signal of NAND gate 116 which indicates detection of a change in gray scale. Combining these two signals in NAND gate 118 generates a logic "one" signal having a duration equal to the period of the high speed clock signal for each change in gray scale detected. This signal is coupled to the first input of a 4-stage counter 125. This enables this counter to be preset to the value of an external digital line width selection number which specifies the line width of vertical line segment to be produced by the printer 44 (FIG. 1). Additionally, this signal permits a line width flip-flop 126 to be set. Setting of the line width flip-flop 126 generates a logic "one" signal at the output of this flip-flop which will ultimately enable the printer 44 (FIG. 1) to begin printing. The complementary output of this flip-flop is coupled to an enable count input terminal of counter 125 enabling this counter to be incremented by the high speed clock signal. Once counting begins, counter 125 continues counting until it reaches its maximum value. When this value is reached a gate 127 receives a signal indicating the maximum count has been reached. The output signal of this gate resets the vertical width flip-flop 126. Resetting of this flip-flop also disables the pulse width counter 125 to disable the printing of vertical lines by the printer 44 (FIG. 1).

In addition to the mode of operation described above, circuitry is included which permits the transitions in the gray scale from black to white or the transitions from white to black to be inhibited. The input to adders, 80 and 81, are selected such that for transitions from white to black there will be an overflow signal from the adders, 80 and 81. This signal is inverted by an inverter 120 and combined with an inhibit white to black transitions signal in a NAND gate 121 to generate a signal which inhibits the multiplexers 95 and 96 when these transitions occur. Similarly, an inhibit black to white transitions signal is combined with the overflow signal from adders 80 and 81 by a NAND gate 122 to generate a signal which inhibits multiplexers 95 and 96 for these transitions. This feature allows existing line art to be scanned and converted to a different size with the line width of the output drawing being selectable by the system operator and independent of the original line width.

Figure 5:
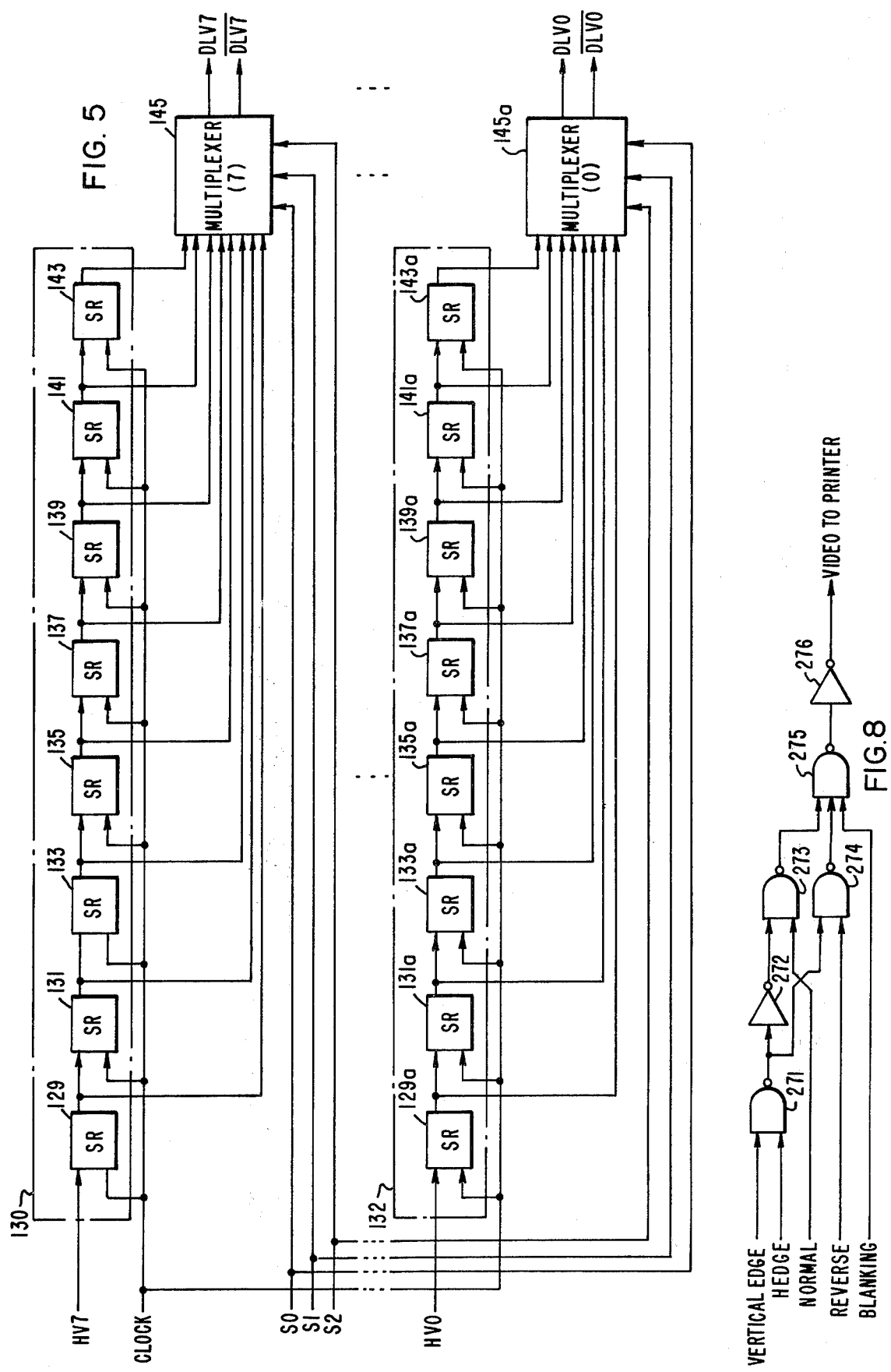
FIG. 5 is a block diagram of the memories used to delay the video samples to detect changes in the gray scale in a direction parallel to the direction of scanning.

The circuitry for detecting changes in the gray scale in a direction parallel to the direction of scan will now be described in detail. The output data from flip-flop memories 50 and 51 (FIG. 2) are also coupled to the input of eight shift registers. Eight identical shift registers are used because each sample of the video signal from the scanner 20 results in eight bits of data at the output of flip-flop memories 50 and 51. Two of the identical shift registers are illustrated in FIG. 5 with the most significant bit of each of the words resulting from sampling the video signal being stored in one of the illustrated registers and the least significant bit of each sample generated by sampling the video from the scanner 20 stored in the other illustrated register. The other bits from each sample are similarly stored however the registers for storing these bits are not illustrated for purposes of simplicity.

Each of the shift registers is actually comprised of sixteen serially connected shift register modules with the modules connected in series. The shift registers are clocked at one-half the sampling speed of the analog-to-digital converter 47 by the low speed clock signal. This reduces the amount of data stored to one-half and is possible because it was not felt that the resolution in the direction parallel to the scan line was as critical as the resolution in the direction perpendicular to the scan line. This permits fewer samples to be stored in order to achieve the desired resolution. Additionally, some applications may not require that the least significant bits of each sample be considered. In such a case, the number of registers can be reduced.

The eight 2,048-bit modules comprising the first register are illustrated at reference numerals 129 through 143. As previously explained, the sampling rate of the analog-to-digital converter 47 (FIG. 2) is 4,096 samples per scan line and if only every other sample is stored in the shift registers, each scan line will require the storage of 2,048 bits of information in each of the shift registers. For example, the most significant bit of each of the samples appearing at the output of flip-flop memories 50 and 51 (FIG. 2) is coupled to the data input of shift register module 129 and this register is clocked at one-half the sample rate of the analog-to-digital converter 47 by the slow speed clock signal, thereby shifting sufficient data into this register 129 to completely fill one module during each scan line. Eight scan lines are required to completely fill modules 129 through 143. The least significant bit of each sample of the video signal is similarly stored in a second register comprised of modules 129a through 143a. Identical numbers followed by a subscript are used to identify the same modules of the two illustrated registers to further emphasize the identity of these two registers. The other 6 bits of each of the data samples available at the output of flip-flop memories 50 and 51 are stored in six other additional and identical shift registers, which are not illustrated as previously discussed for purposes of simplicity.

Each module of the registers illustrated in FIG. 5 store precisely one scan line of information. Since these registers are continually shifted at one-half the sample rate of the analog-to-digital converter 47 by the low speed clock signal, for any sample of data appearing at the output of flip-flop memories, 50 and 51, the corresponding value for the previous eight scan lines is available at the output of one of the modules comprising these shift registers. For example, the output of module 129 is the corresponding sample from the previous scan line. Correspondingly, the output from module 143 is the sample corresponding to the sample currently being digitized displaced therefrom by 8 scan lines.

The output of each of the modules, 131, 133, 135, 137, 139, 141 and 143 comprising the shift register are coupled as inputs to a multiplexer 145. A 3-bit digital line select signal is coupled to the select inputs of this multiplexer to select which of the inputs and its complement are to be coupled to the output. This enables data from any one of the eight previous scan lines to be selected and made available at the output of this multiplexer 145. Similarly, the outputs of various modules of the second register are selected to generate at the output of multiplexer 145a samples of the data from a previous scan line as described above with reference to the first register.

Figure 6:
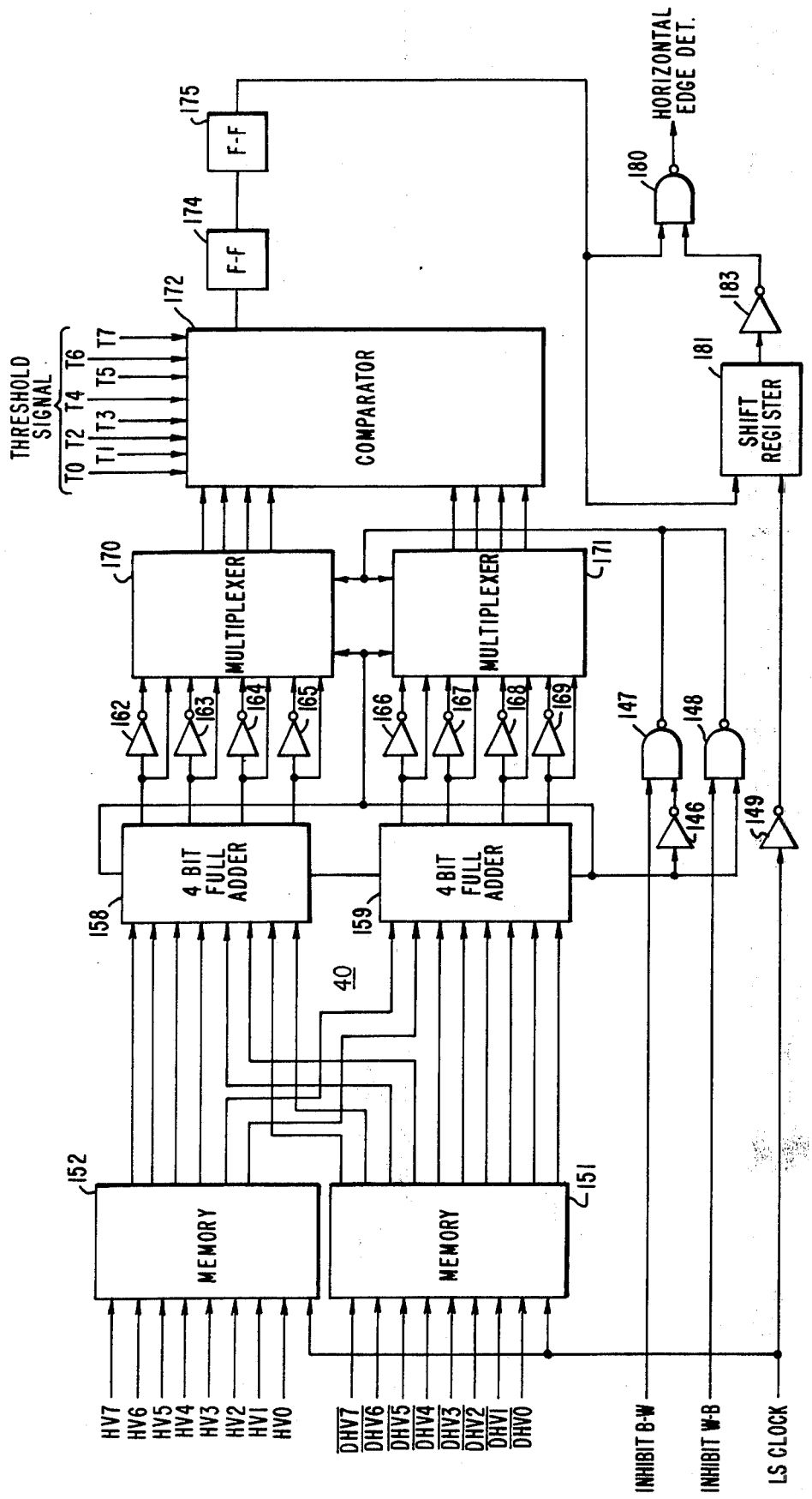
FIG. 6 is a diagram of the circuitry used to detect changes in the gray scale in the direction parallel to the scan.

The complement output signals from multiplexers 145 and 145a are coupled as input data to memory 151 (FIG. 6). This memory is clocked by low speed clock signal that shift the registers illustrated in FIG. 5. Thus, for each clock pulse a new sample of data is available at the output of memory 151. Similarly, output signals from flip-flop memories, 50 and 51, are stored in a memory 152. Memory 152 responds to only alternate outputs of A/D converter and shifts the data to the same clock rate as the output of multiplexers 145 and 145a. Memory 151 is the same type as memory 152 and compensates for circuit delays. The output signals of memories 151 and 152 are coupled as input signals to two four-bit adders 158 and 159. The output of adders 158 and 159 are inverted by inverters 162 through 169. Two multiplexers 170 and 171 combine the output signals of adder modules 158 and 159 and the output signals of inverters 162 through 169 to produce the absolute value of the difference between the digital number representing the current amplitude of the video signal and the digital number representing the amplitude of this signal at the selected prior sampling interval. The absolute value of this difference is compared to a threshold by a comparator 173. Whenever the absolute value exceeds the selected threshold, indicating that a significant change in the gray scale of the image being scanned as detected, a logic one signal is generated at the output of the four-bit comparator 173. This signal is shifted through a 2-bit delay circuit comprising two flip-flops, 174 and 175, to produce an output signal indicating that a significant change in the gray scale of the image being scanned has been detected. This delay adjusts the horizontal line components the equivalent of four high speed clock pulses to compensate for a four-bit shift in the vertical line components inherent in the operation of the center detection circuit of FIG. 4. It should be noted that the center detection circuit can also be used to improve the detection of horizontal changes in the gray scale of the image being scanned. For some applications this may be desirable; however, in the preferred and illustrated embodiment, the cost of the memories required and the intended application indicated that the circuit should not be used for the horizontal direction. The output of flip-flop 175 is coupled to one input of a two-input NAND gate 180 causing the output of this gate to go to a logic "zero" indicating that a significant change in the gray scale in a direction parallel to the scan line has been detected. Circuitry is also included which inhibits detection of transitions from white to black or black to white from being detected. This is accomplished by inverting the overflow signal from adder modules 158 and 159 by an inverter 146. The inverted overflow signal is combined with the inhibit black to white signal in a NAND gate 147 to generate a signal which inhibits the output of multiplexers 170 and 171 for black to white transitions in the image being scanned. Similarly, the inhibit white to black transitions signal is combined with the overflow signal from adder modules 151 and 152 to generate a signal which inhibits the output of multiplexers 170 and 171 for white to black transitions of the image being scanned. This function is identical with the similar circuit described for the vertical detection circuit (FIG. 4).

The input signal to NAND gate 180 is also coupled as an input signal to a 2,048-bit shift register 181. The output signal of the shift register 181 is inverted by an inverter 183 and coupled to the second input of NAND gate 180. This causes the output signal of gate 180 to go low whenever a significant change in the gray scale is indicated by the output signal of flip-flop 175 and return to a high one scan line later. This assures that any detected change in the gray scale in a direction parallel to the scan line will be reduced in duration to one scan line.

Figure 7:
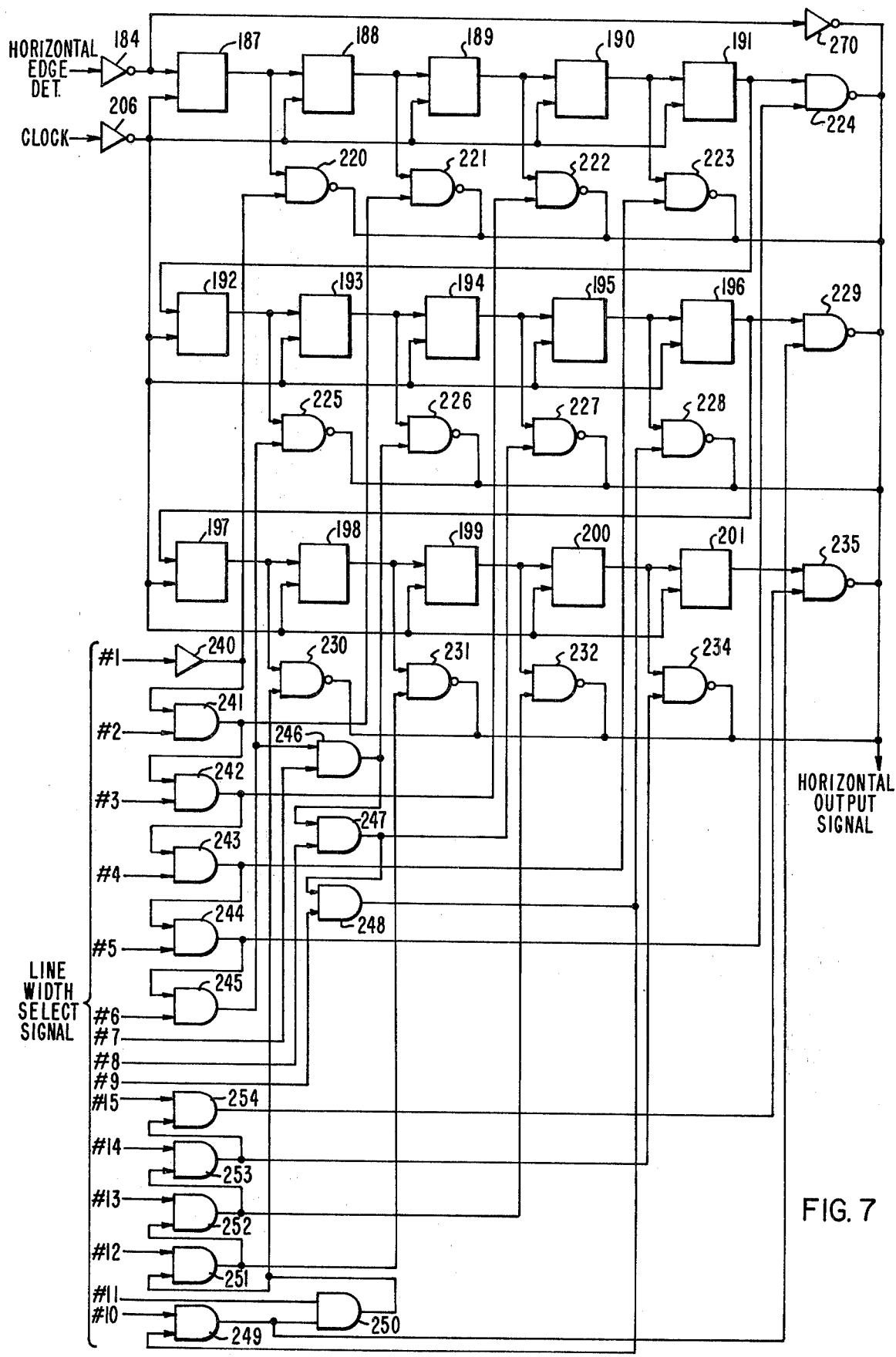
FIG. 7 is a block diagram of the memories used for storing data to generate a signal which determines the width of horizontal line segments produced by the printer.

The output signal from NAND gate 180 (FIG. 6) is coupled as an input signal to a NAND gate 184 (FIG. 7). Gate 184 inverts this signal and provides an input signal to a 15-stage shift register with the stages illustrated at reference numerals 187 through 201. Each stage of this shift register has 2,048 storage locations and is shifted by the low speed clock signal coupled to the input of inverter 206. This causes each of the pulses from gate 180 (FIG. 6) indicating a change in gray scale and vertical direction has been detected to be repeated at the output of a stage of this shift register with the maximum number of lines the signal is repeated being equal to fifteen. The output signals from each of these shift registers is combined in a gating circuit to generate a signal indicating the width of the line to be printed by printer 44 (FIG. 1) when a change in the gray scale of the image scanned in a direction parallel to the scan direction is detected. The detailed operation of this gating circuit is described below.

The output signals of the shift registers 187 through 201 are respectively coupled to the first input terminal of fifteen NAND gates 220 through 235. Bits one through 15 of a fifteen-bit digit line width select signal are respectively coupled to the input of amplifier 240 and the first input or fourteen AND gates 241 through 254. The output signal of amplifier 240 and the fourteen AND gates, 241 through 254, are respectively coupled to the second input terminals or fifteen AND gates 220 through 234. The output signal of the amplifier 240 is coupled to the second input terminal of an AND gate 241. Output signals or AND gates 241 through 253 are respectively coupled as input signals to AND gates 242 through 254. An inverter 270 inverts the input signal to the first shift register 187. NAND gates 220 through 235 and inverter 270 are connected in a wired "OR" arrangement to generate at the output terminal of these gates a signal defining line segments to be printed by the printer 44 (FIG. 1). If a logic "zero" is applied to the input of amplifier 240, its output will be a logic "zero" forcing the output of gate 241 to a logic "zero". Similarly the outputs of gate 241 through 244 will force the outputs of gates 242 through 245 respectively to a logic "zero". In this condition, gates 220 through 234 will be inhibited and the only signal on the common output line will be the original signal coupled through inverters 184 and 270. This will provide horizontal line segments with a width equivalent to one scan line. If a logic "zero" signal is applied to the input of gate 241 with all other gate inputs and amplifier 240 being a logic "one", the output of amplifier 240 will be a logic one and the output of gates 241 through 254 will be logic zero. In this condition gate 220 is enabled and gates 221 through 235 are disabled allowing the delayed information from register 187 to be combined with the original signal to provide horizontal line segment with a width of two scan lines. Similarly by successively applying a logic "one" signal to gates 242 through 254 will successively enable gates 221 through 235. Thus any selected number of gates 220 through 233 can be enabled and any number of delayed detection samples can be combined to provide a selectable line width on printer 44 (FIG. 1) with the maximum width equivalent to 16 scan lines. A line width of 16 scan lines is produced when all bits of the line width select signal to amplifier 240 and gates 241 through 254 are logic one.

The horizontal and vertical edge detect signals are coupled to the two inputs of a NAND gate 271 (FIG. 8) to generate at the output of this gate a logic "one" signal when either a horizontal or vertical edge has been detected. This signal is inverted by an inverter 272. The output signal of this inverter 272 and a "normal" signal are coupled as inputs to a NAND gate 273. A "reverse" signal and the output signal of a NAND gate 271 are coupled to the input terminals of NAND gate. Output signals from the two NAND gates 273 and 274 and a blanking signal are combined in a three-input NAND gate 275. The output signal of this gate is inverted by an inverter 276 to generate a video signal for the printer. The printed image will be either "normal" or "reversed" depending on logic level of the normal and reverse signals.

I claim:
1. A system for scanning an image to produce a line drawing with the lines of said drawing representing changes in the gray scale of said image, comprising:
   a. scanning means for scanning said image to produce a video signal comprising a plurality of lines;
   b. digitizing means for sampling and digitizing said video signal at predetermined intervals to generate a plurality of digital numbers with each of said digital numbers representing the amplitude of said video signal at the corresponding sampling time;
   c. storage means for storing a plurality of said digital numbers;
   d. first means for comparing each of said digital numbers to a first selected digital number read from said storage means to generate a first difference signal indicative of a change in the gray scale of said image in a direction perpendicular to scanning;
   e. means responsive to said first difference signal to generate a print signal of constant amplitude and a selected duration; and
   f. printer means responsive to at least said first print signal to print first a line segment corresponding to said first print signal.

2. A system in accordance with claim 1 further including:
   a. second means for comparing each of said digital numbers to a second selected digital number read from said storage means to generate a second difference signal indicative of a change in the gray scale of said image in a direction parallel to scanning; and
   b. means responsive to said second difference signal to generate a second print signal indicative of a change in the gray scale of said image in a direction parallel to scanning, wherein
   c. said printer means is responsive to at least said first and second print signals to produce said line drawing.

3. A system in accordance with claim 1 wherein said scanner means is a laser.

4. A system in accordance with claim 1 wherein said storage means for storing a plurality of said digital numbers comprises multibit shift register means.

5. A system in accordance with claim 4 wherein said multibit shift register means includes a first plurality of shift registers for storing said digital numbers to provide said first selected digital numbers and a second plurality of shift registers for storing said digital numbers to provide said second selected digital numbers.

6. A system in accordance with claim 5 wherein said first plurality of shift registers include sufficient storage capacity to permit said first selected digital number to be delayed from the digital number resulting from the current sample by a time interval equal to at least eight of said predetermined intervals.

7. A system in accordance with claim 5 wherein said second plurality of shift registers include sufficient storage capacity to permit said second selected digital number to be delayed from the digital number resulting from the current sample by at least eight lines of said video signal.

8. A system in accordance with claim 6 wherein said first plurality of shift registers includes an individual shift register coupled to receive and store the individual bits comprising each of said plurality of digital numbers.

9. A system in accordance with claim 6 wherein said second plurality of shift registers includes an individual shift register coupled to receive and store the individual bits comprising each of said plurality of digital numbers.

* * * * *